US011085172B2

(12) United States Patent
Sugiyama et al.

(10) Patent No.: US 11,085,172 B2
(45) Date of Patent: Aug. 10, 2021

(54) CONSTRUCTION MACHINE

(71) Applicant: Hitachi Construction Machinery Co., Ltd., Tokyo (JP)

(72) Inventors: Haruki Sugiyama, Kasumigaura (JP); Ken Takeuchi, Kasumigaura (JP); Akira Watanabe, Ushiku (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 16/644,409

(22) PCT Filed: Feb. 7, 2019

(86) PCT No.: PCT/JP2019/004441
§ 371 (c)(1),
(2) Date: Mar. 4, 2020

(87) PCT Pub. No.: WO2019/176392
PCT Pub. Date: Sep. 19, 2019

(65) Prior Publication Data
US 2020/0199848 A1 Jun. 25, 2020

(30) Foreign Application Priority Data
Mar. 14, 2018 (JP) .............................. JP2018-046593

(51) Int. Cl.
*E02F 9/20* (2006.01)
*B60L 50/60* (2019.01)
(Continued)

(52) U.S. Cl.
CPC ............ *E02F 9/2091* (2013.01); *B60L 50/66* (2019.02); *B60L 58/22* (2019.02); *H02J 7/0014* (2013.01);
(Continued)

(58) Field of Classification Search
CPC ........ E02F 9/2091; H02P 27/06; Y02E 60/10; Y02T 90/14; Y02T 10/7072; Y02T 10/70;
(Continued)

(56) References Cited

U.S. PATENT DOCUMENTS

2009/0085516 A1  4/2009 Emori et al.
2009/0314557 A1* 12/2009 Takeuchi ................. B60K 1/04
                                          180/65.1
(Continued)

FOREIGN PATENT DOCUMENTS

JP       2009-89484 A    4/2009
JP       2014-18038 A    1/2014
(Continued)

OTHER PUBLICATIONS

International Search Report (PCT/ISA/210) issued in PCT Application No. PCT/JP2019/004441 dated Apr. 9, 2019 with English translation (three (3) pages).
Japanese-language Written Opinion (PCT/ISA/237) issued in PCT Application No. PCT/JP2019/004441 dated Apr. 9, 2019 (six (6) pages).

*Primary Examiner* — John W Poos
*Assistant Examiner* — Alex W Lam
(74) *Attorney, Agent, or Firm* — Crowell & Moring LLP

(57) ABSTRACT

A storage battery (21) is configured of a plurality of cells (22A) to (22N) series-connected to each other. A battery controller (27) receives power supplied from a lead battery (31). The battery controller (27) executes balancing control that reduces variation in cell voltages (VcA) to (VcN) of the plurality of cells (22A) to (22N). The battery controller (27) executes the balancing control in a time range during which a voltage of the lead battery (31) becomes equal to or more than a predetermined given voltage value (V1) and a charging rate of the storage battery (21) becomes equal to or more than a predetermined given charging rate value (SOC1) after a key switch (16) is switched from an on state to an off state.

3 Claims, 9 Drawing Sheets

(51) Int. Cl.
*B60L 58/22* (2019.01)
*H02J 7/00* (2006.01)
*H02P 27/06* (2006.01)

(52) U.S. Cl.
CPC ....... *H02J 7/0047* (2013.01); *B60L 2240/547* (2013.01); *H02P 27/06* (2013.01)

(58) Field of Classification Search
CPC .... H01M 10/44; H01M 10/48; H01M 10/482; H01M 2010/4271; H01M 2220/20; B60L 58/19; B60L 50/66; B60L 58/22; B60L 2240/547; B60L 2200/40; B60L 2240/80; B60L 2250/16; B60L 53/14; B60L 1/003; B60L 50/61; B60L 50/60; H02J 7/0019; H02J 7/0014; H02J 7/0047; H02J 7/1446; B60Y 2200/41
See application file for complete search history.

(56) References Cited

U.S. PATENT DOCUMENTS

| | | |
|---|---|---|
| 2015/0211212 A1 | 7/2015 | Takeo et al. |
| 2015/0303728 A1 | 10/2015 | Miura et al. |
| 2017/0170668 A1 | 6/2017 | Hayashizaki et al. |
| 2019/0252909 A1* | 8/2019 | Sugiyama ............ B62D 5/0481 |

FOREIGN PATENT DOCUMENTS

| | | |
|---|---|---|
| JP | 2014-187735 A | 10/2014 |
| JP | 5831376 B2 | 12/2015 |
| JP | 5980943 B2 | 8/2016 |
| JP | 2017-110969 A | 6/2017 |
| WO | WO 2014/057724 A1 | 4/2014 |
| WO | WO 2014/061153 A1 | 4/2014 |

* cited by examiner

CONSTRUCTION MACHINE

TECHNICAL FIELD

The present invention relates to a construction machine such as a hydraulic excavator.

BACKGROUND ART

There is known a construction machine provided with an electric motor as a drive source of a vehicle body. In such a construction machine, power is supplied to the electric motor from a battery unit. The battery unit is configured of a plurality of cells series-connected for achieving a large capacity of the power. The battery unit performs charging or discharging at the time of driving the electric motor. At this time, each cell is required to be used within a range between an upper limit voltage and a lower limit voltage for preventing the performance degradation of the battery unit.

Here, the cell in the battery unit naturally discharges a little by a little by an influence of an internal resistance, for example. The discharge amount varies for each cell. In addition, as the time elapse becomes the longer, the discharge amount for each cell varies the more greatly. When the charging or the discharging of the battery unit is performed in a state where a charging rate between cells varies greatly, in some cases only the cell in which the variation of the charging rate is great becomes in a state of being out of an appropriate range. That is, in some cases only the cell, the cell voltage of which is maximized, of the plurality of cells reaches the upper limit voltage. Likewise, in some cases only the cell, the cell voltage of which is minimized, of the plurality of cells reaches the lower limit voltage. As a result, the charging and discharging of the battery unit are possibly restricted to exert an adverse effect over the performance of the battery unit.

There is known balancing control that equalizes the charging rate between the cells for suppressing the variation in the charging rate between the cells (Patent Document 1). Patent Document 1 discloses the configuration that for equalizing the charging rate between the cells based upon cell information in relation to a plurality of cells, only cells the charging rate of which is high are selected to be discharged. This discharging is executed from a point where a key switch is turned on and a vehicle body is activated to a point where the equalization of the charging rate between the cells is completed.

In addition, there is also known the configuration that even after the key switch is turned off and the vehicle body is stopped, it is possible to determine whether or not the balancing control is required (Patent Document 2, 3). Patent Document 2 discloses the configuration that a signal is sent to a power source part for each preset periodic time to launch a control part of the balancing control and periodically execute the balancing control. Patent Document 3 discloses the configuration that first, the control part of the balancing control is activated, and in that state, the determination part of the balancing control is activated for each preset periodic time.

PRIOR ART DOCUMENT

Patent Document

Patent Document 1: Japanese Patent Laid-Open No. 2009-89484 A

Patent Document 2: WO 2014/061153 A1 (Japanese Patent 5980943)

Patent Document 3: Japanese Patent Laid-Open No. 2014-18038 A (Japanese Patent No. 5831376)

SUMMARY OF THE INVENTION

Incidentally, while the vehicle body is working, a state of the battery unit is always managed. In addition to it, the construction machine is provided with a power source battery different from the battery unit. This power source battery supplies power to a controller for executing the balancing control. While the vehicle body is working, a state of the power source battery is also managed. Therefore, even when the balancing control is executed, the battery unit and the power source battery each maintain a normal state. In the conventional balancing control, however, a reduction in the remaining amount of the power source battery, a reduction in the charging rate of the battery unit by the balancing control and the like are not considered after the key switch is turned off. Therefore, the balancing control is executed out of the appropriate range of the power source battery or the battery unit, possibly exerting the effect over the next vehicle activation.

The present invention is made in view of the aforementioned problem in the conventional technology, and an object of the present invention is to provide a construction machine that can equalize a charging rate between cells in order to prevent activation of a vehicle body from being affected.

For solving the aforementioned problem, a construction machine according to the present invention comprises: a hydraulic pump driven by an electric motor; a working mechanism driven by hydraulic oil delivered from the hydraulic pump; a first battery that is configured of a plurality of cells series-connected to each other and supplies power to the electric motor; a cell voltage detector that detects a cell voltage of each of the plurality of cells; a battery controller to which power is supplied from a second battery and that executes balancing control for reducing variation in the cell voltage of the plurality of cells; and a key switch having a drive position for driving the electric motor and a stop position for stopping the electric motor, characterized in that: the battery controller executes the balancing control in a time range during which a voltage of the second battery becomes equal to or more than a predetermined given voltage value and a charging rate of the first battery becomes equal to or more than a predetermined given charging rate value after the key switch is switched from the drive position to the stop position.

According to the present invention, the charging rate between cells can be equalized in order to prevent an influence of balancing control from being exerted over the activation of a vehicle body.

MODE FOR CARRYING OUT THE INVENTION

Hereinafter, an explanation will be in detail made of a hybrid hydraulic excavator taken as an example of a construction machine according to an embodiment in the present invention with reference to the accompanying drawings.

Figure 1:
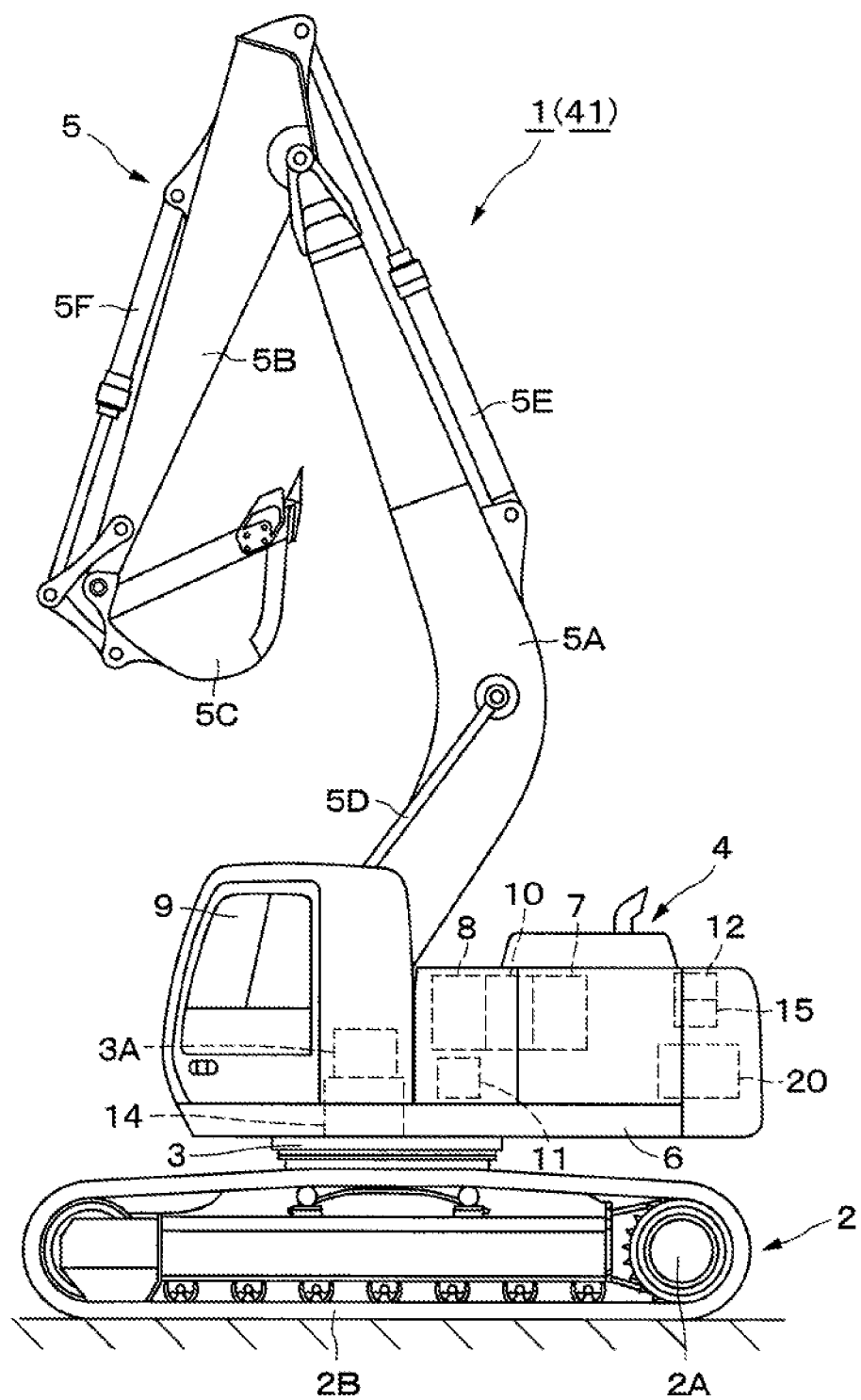
FIG. 1 is a front view showing a hybrid hydraulic excavator according to an embodiment of the present invention.
Figure 2:
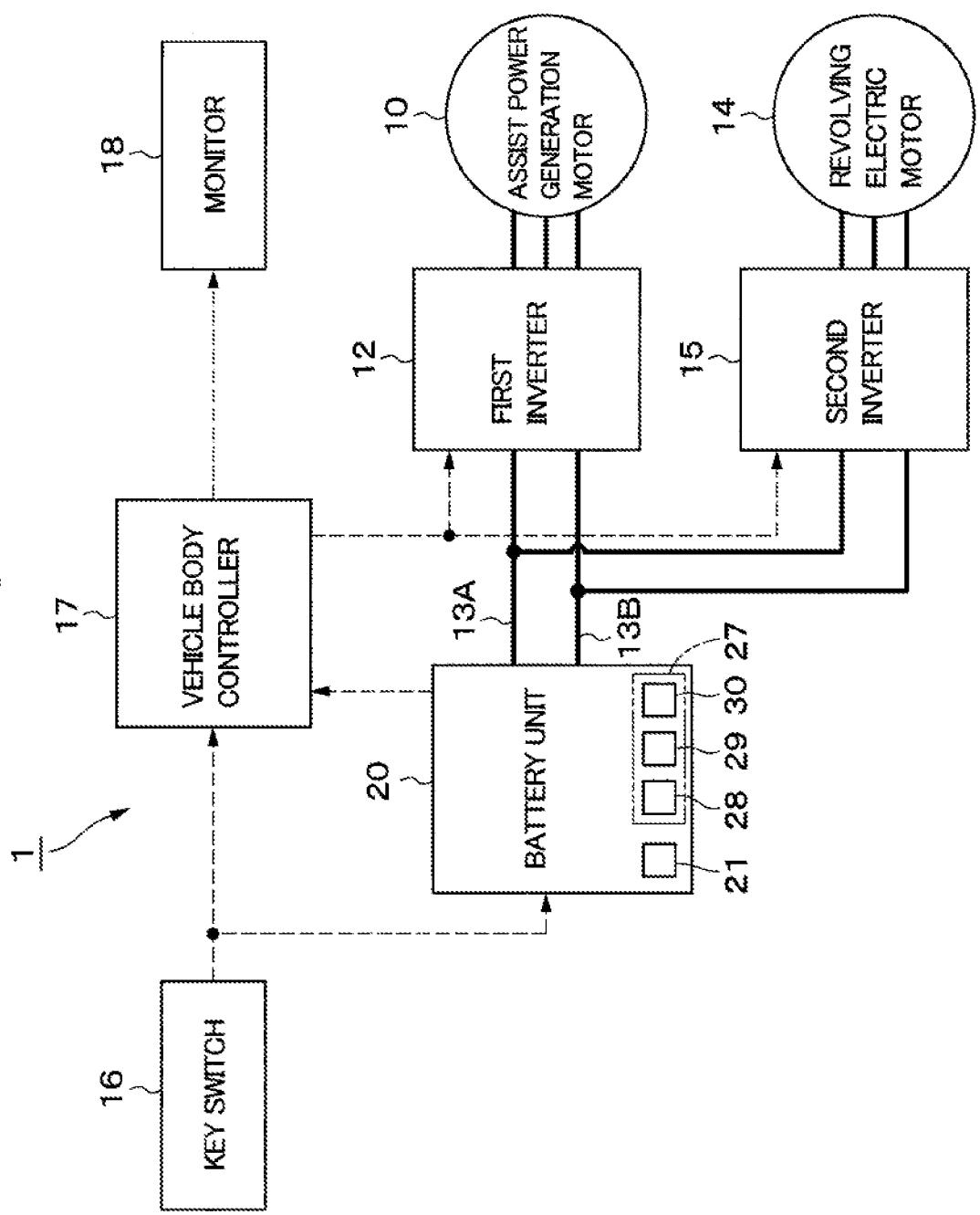
FIG. 2 is a block diagram showing a drive system of the hydraulic excavator in FIG. 1.

FIG. 1 and FIG. 2 show a hybrid hydraulic excavator 1 according to the embodiment. As shown in FIG. 1, the hydraulic excavator 1 is provided with an automotive lower traveling structure 2 of a crawler type, an upper revolving structure 4 that is mounted on the lower traveling structure 2 through a revolving device 3 to be capable of revolving thereon, and a working mechanism 5 of an articulated structure that is provided in the front side of the upper revolving structure 4 to perform an excavating operation and the like. The lower traveling structure 2 and the upper revolving structure 4 configure a vehicle body of the hydraulic excavator 1. The lower traveling structure 2 is provided with a hydraulic motor 2A for performing a traveling operation. The revolving device 3 is provided with a hydraulic motor 3A for performing a revolving operation. It should be noted that a lower traveling structure of a crawler type is exemplified as the lower traveling structure 2, but even a lower traveling structure of a wheel type may be adopted.

The working mechanism 5 is a front actuator mechanism. The working mechanism 5 is configured of, for example, a boom 5A, an arm 5B and a bucket 5C, and a boom cylinder 5D, an arm cylinder 5E and a bucket cylinder 5F, which drive the above components. The working mechanism 5 is attached to a revolving frame 6 of the upper revolving structure 4. The working mechanism 5 is drive by hydraulic oil delivered by a hydraulic pump 8. It should be noted that the working mechanism 5 is not limited to one provided with the bucket 5C, but may be provided with, for example, a grapple or the like.

The upper revolving structure 4 is provided with an engine 7 as an internal combustion engine such as a diesel engine, and the hydraulic pump 8 (a main pump) that is driven by the engine 7. In addition, an assist power generation motor 10 is connected mechanically to the engine 7. Therefore, the hydraulic pump 8 is driven by the assist power generation motor 10 as well. The hydraulic pump 8 delivers the hydraulic oil. The lower traveling structure 2, the upper revolving structure 4 and the working mechanism 5 operate independently from each other by this hydraulic oil.

Specifically, the lower traveling structure 2 drives a pair of crawlers 2B (only one of them is shown in FIG. 1) for travel by delivery of the hydraulic oil from the hydraulic pump 8 to the traveling hydraulic motor 2A. The upper revolving structure 4 drives and revolves by delivery of the hydraulic oil from the hydraulic pump 8 to the revolving hydraulic motor 3A. The cylinders 5D to 5F expand or contract by delivery of the hydraulic oil from the hydraulic pump 8 thereto. Thereby, the working mechanism 5 performs lifting and tilting operations to perform a work such as an excavating operation or a land leveling operation. In addition, the upper revolving structure 4 is provided with a cab 9. An operator gets on the cab 9 and controls the hydraulic excavator 1.

Next, an explanation will be made of a drive system of an electric system in the hydraulic excavator 1 with reference to FIG. 2. In FIG. 2, the assist power generation motor 10 is coupled mechanically to the engine 7. The assist power generation motor 10 and the engine 7 drive the hydraulic pump 8 as a hydraulic generator. Therefore, the assist power generation motor 10 configures an electric motor that drives the hydraulic pump 8. The hydraulic oil delivered from the hydraulic pump 8 is distributed in a control valve 11, based upon an operation by the operator. As a result, the boom cylinder 5D, the arm cylinder 5E, the bucket cylinder 5F, the traveling hydraulic motor 2A and the revolving hydraulic motor 3A are driven by the hydraulic oil delivered from the hydraulic pump 8.

The assist power generation motor 10 plays two roles of power generation of performing power supply to a lithium-ion battery unit 20 (hereinafter, referred to as "battery unit 20") by acting as a power generator using the engine 7 as a power source, and power running of assisting in the engine 7 and the drive of the hydraulic pump 8 by acting as a motor using the power from the battery unit 20 as a power source. Accordingly, when the assist power generation motor 10 dives as the motor, the assist power generation motor 10 is driven by the power of the battery unit 20.

The assist power generation motor 10 is connected via a first inverter 12 as a power converter to a pair of DC buses 13A, 13B (DC cables) at a positive electrode side and at a negative electrode side. The first inverter 12 is configured using a plurality of switching elements such as a transistor and an insulating gate bipolar transistor (IGBT). At the power generation time of the assist power generation motor 10, the first inverter 12 converts AC power from the assist power generation motor 10 into DC power, which is supplied to the battery unit 20. At the power running time of the assist power generation motor 10, the first inverter 12 converts the DC power of the DC buses 13A, 13B into AC power, which is supplied to the assist power generation motor 10.

A revolving electric motor 14 is driven by the power from the assist power generation motor 10 or the battery unit 20. The revolving electric motor 14 is configured of, for example, a three-phase induction motor, and is disposed on the upper revolving structure 4 together with the hydraulic motor 3A. The revolving electric motor 14 drives the revolving device 3 in cooperation with the hydraulic motor 3A.

The revolving electric motor 14 is connected via a second inverter 15 to the DC buses 13A, 13B. The revolving electric motor 14 plays two roles of power running of driving/rotating by receiving the power from the battery unit 20 or the assist power generation motor 10, and regeneration of storing power in the battery unit 20 by generating the power with extra torque at the revolving braking time. The second inverter 15 is configured of a plurality of switching elements, as similar to the first inverter 12.

A key switch 16 has a drive position (an on position) for driving the assist power generation motor 10 and a stop position (an off position) for stopping the assist power generation motor 10. When the key switch 16 is turned on, a vehicle body activation signal is sent to a vehicle body controller 17 and the battery unit 20.

The vehicle body controller 17 outputs a torque command to the first inverter 12 and the second inverter 15. The vehicle body controller 17 causes a monitor 18 to display a state of the battery unit 20. The assist power generation motor 10 is connected via the first inverter 12 to the battery unit 20. The assist power generation motor 10 assists in the hydraulic pump 8 and performs charging to the battery unit 20 in response to the torque command outputted from the vehicle body controller 17. The revolving electric motor 14 is connected via the second inverter 15 to the battery unit 20. The revolving electric motor 14 assists in the hydraulic motor 3A at the revolving operation time of the upper revolving structure 4 and performs the charging to the battery unit 20 by regeneration braking in response to the torque command outputted from the vehicle body controller 17.

Next, an explanation will be made of a specific configuration of the battery unit 20 with reference to FIG. 3. Here, there will be explained a case where the battery unit 20 is provided with a plurality of cells 22A to 22N as an example. However, the number of the cells may be two, or three or any number more than three.

Figure 3:
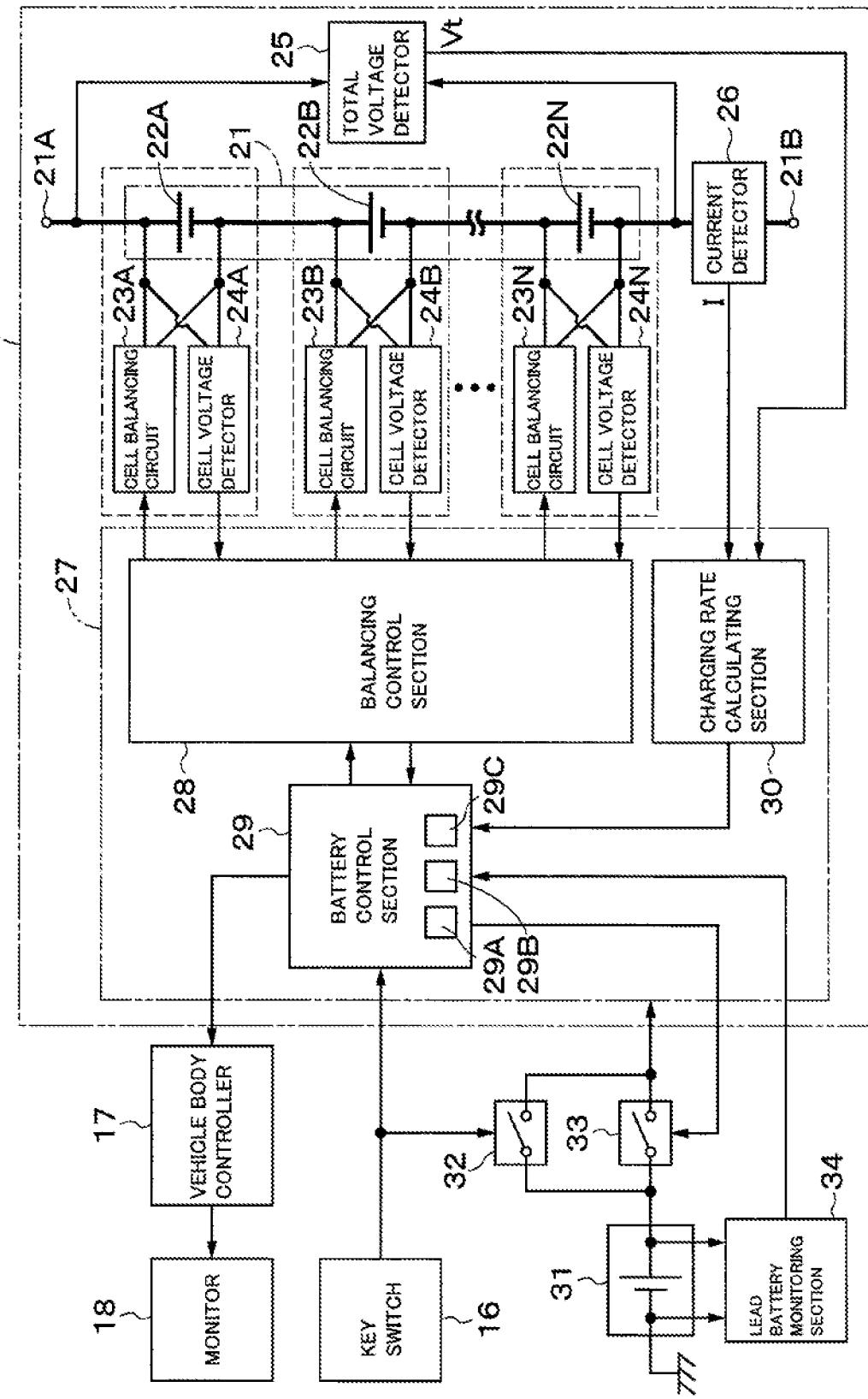
FIG. 3 is a block diagram showing the configuration of a battery unit in FIG. 2.

FIG. 3 shows the configuration of the battery unit 20. The battery unit 20 is provided with a storage battery 21, cell balancing circuits 23A to 23N, cell voltage detectors 24A to 24N, a total voltage detector 25, a current detector 26 and a battery controller 27.

The storage battery 21 configures a first battery that supplies power to the assist power generation motor 10 as an electric motor. The storage battery 21 supplies the power to the revolving electric motor 14 as well. The storage battery 21 is configured of the plurality of cells 22A to 22N series-connected to each other. The storage battery 21 is a lithium-ion secondary battery, for example, and is an assembled battery configured of the plurality of cells 22A to 22N. The plurality of cells 22A to 22N hold electrical charges. A terminal 21A of the storage battery 21 at the positive electrode side is connected via a relay (not shown) to the DC bus 13A at the positive electrode side. A terminal 21B of the storage battery 21 at the negative electrode side is connected via a relay (not shown) to the DC bus 13B at the negative electrode side.

The cell balancing circuit 23A is parallelly-connected to the cell 22A. The cell balancing circuit 23A adjusts a charging rate of the cell 22A in response to a signal of a balancing control section 28. The cell balancing circuit 23A is provided with a switch and a discharge resistance series-connected to each other (any of them is not shown). The switch of the cell balancing circuit 23A is normally in an off state (in an opened state). The cell balancing circuit 23A turns on (closes) a switch SW based upon a command of the balancing control section 28. As a result, The cell balancing circuit 23A causes a current to the discharge resistance to discharge the cell 22A. In addition, the cell voltage detector 24A is connected to the cell 22A. The cell voltage detector 24A measures a cell voltage VcA applied to both ends of the cell 22A.

The cell balancing circuits 23B to 23N and the cell voltage detectors 24B to 24N are connected, as similar to the cell 22A, to the cells 22B to 22N as well. The cell voltage detectors 24A to 24N detect cell voltages VcA to VcN of the plurality of cells 22A to 22N respectively.

The total voltage detector 25 is connected to both ends of the storage battery 21. The total voltage detector 25 detects a total voltage value Vt of the series-connected cells 22A to 22N. At this time, the total voltage value Vt amounts to an additional value of all of the cell voltages VcA to VcN. The total voltage detector 25 outputs the detected total voltage value Vt to a charging rate calculating section 30 of the battery controller 27.

The current detector 26 detects a current value I flowing in the cells 22A to 22N. The current detector 26 outputs the detected current value I to the charging rate calculating section 30 of the battery controller 27.

Figure 4:
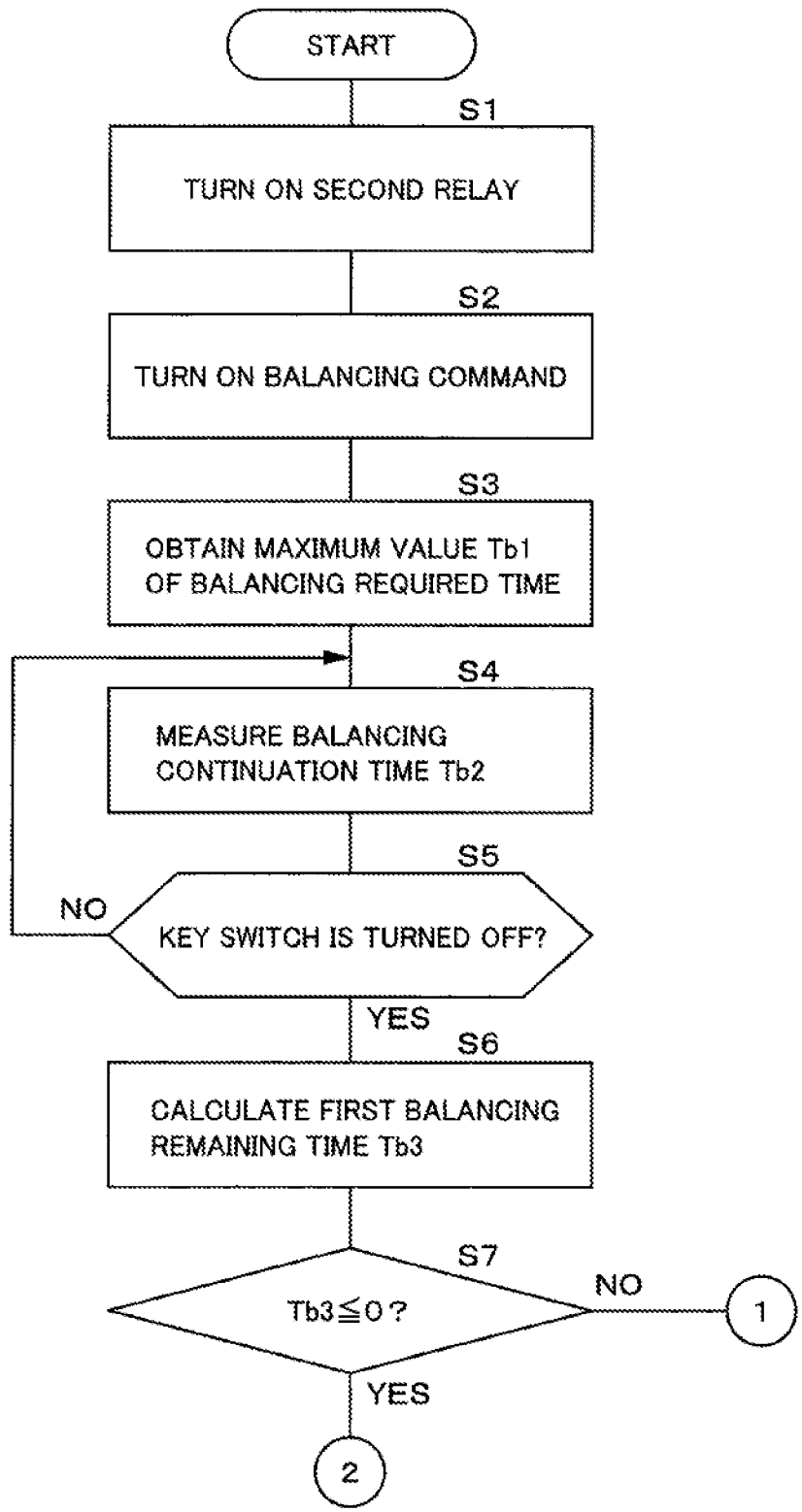
FIG. 4 is a flow chart showing balancing control processing by a battery control section.
Figure 5:
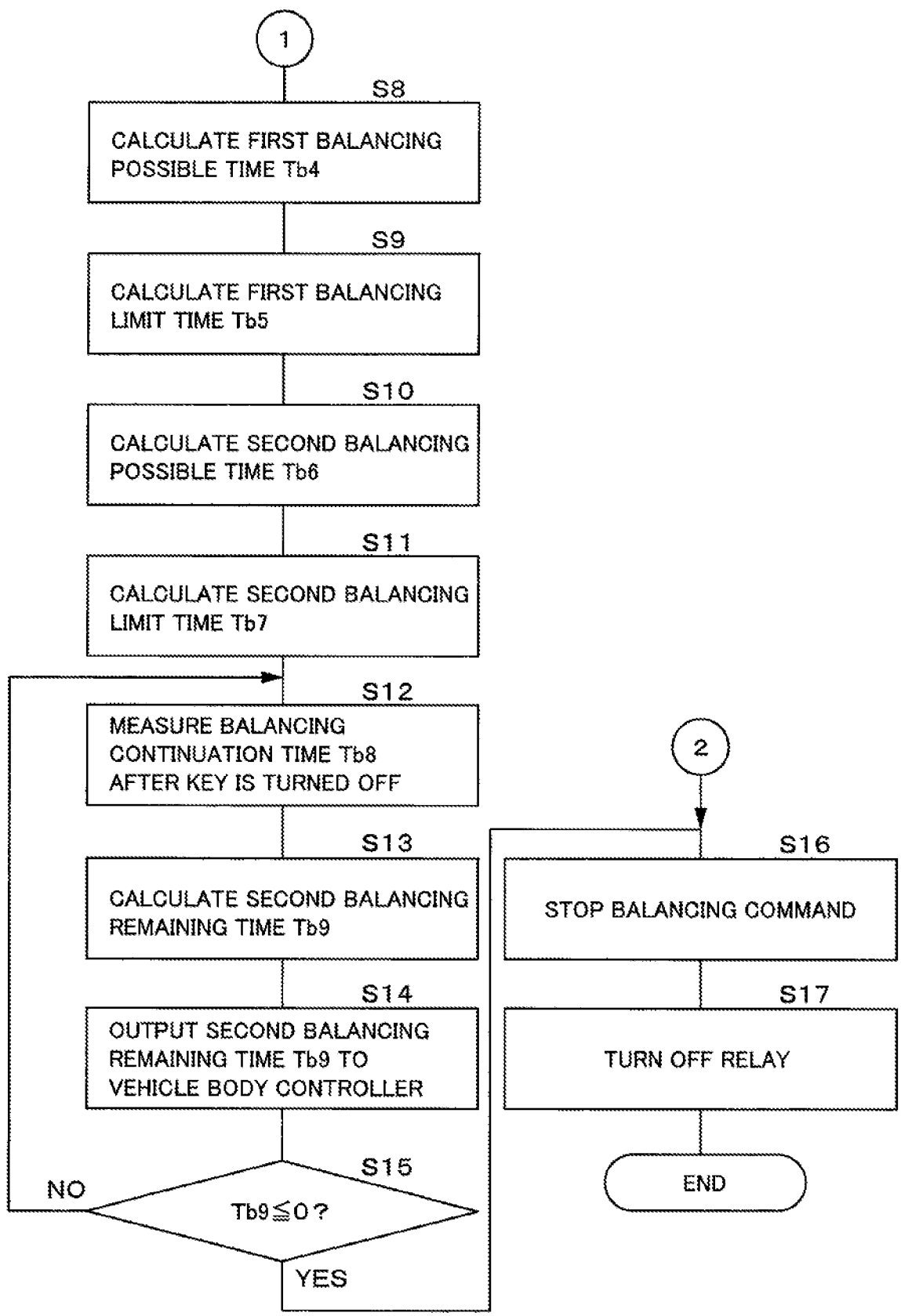
FIG. 5 is a flow chart subsequent to FIG. 4.

The battery controller 27 controls the cell voltages VcA to VcN. The battery controller 27 receives power supplied from a lead battery 31 (a second battery) to execute the balancing control that reduces variation in the cell voltages VcA to VcN of the plurality of cells 22A to 22N. The battery controller 27 is configured of a microcomputer, for example. The battery controller 27 is provided with the balancing control section 28, a battery control section 29 and the charging rate calculating section 30. A program of the balancing control processing as shown in FIG. 4 and FIG. 5 is stored in a memory part (not shown) of the battery controller 27.

The balancing control section 28 discharges cells high in the cell voltage based upon each of the cell voltages VcA to VcN detected by the cell voltage detectors 24A to 24N to control the cell balancing circuits 23A to 23N to equalize the cell voltage. Specifically, while the balancing command is outputted from the balancing control section 28, when a difference in voltage between the maximum cell voltage of the cell voltages VcA to VcN and the minimum cell voltage of the cell voltages VcA to VcN goes beyond a predetermined threshold value voltage, the balancing control section 28 executes the balancing control. As a result, the difference in voltage is suppressed to a value smaller than the threshold value voltage.

The balancing control section 28 calculates a balancing required time Tb0 based upon the cell voltages VcA to VcN of the cell voltage detectors 24A to 24N in response to a balancing command from the battery control section 29. The balancing control section 28 controls the cell balancing circuits 23A to 23N and executes the balancing control in accordance with the balancing required time Tb0.

The battery control section 29 outputs the balancing command to the balancing control section 28 to control start and stop of the balancing control by the balancing control section 28. The balancing control section 28, the key switch 16, the charging rate calculating section 30 and a lead battery monitoring section 34 are connected to the input side of the battery control section 29. The balancing control section 28, a second relay 33 and the vehicle body controller 17 are connected to the output side of the battery control section 29. The battery control section 29 executes the program of the balancing control processing as shown in FIG. 4 and FIG. 5. The battery control section 29 outputs the balancing command when the key switch 16 is switched from an off state to an on state. Thereby, the battery control section 29 starts the balancing control. The battery control section 29 continues to output the balancing command to continuously execute the balancing control even when the key switch 16 is switched from the on state to the off state. Thereafter, the battery control section 29 stops the balancing control based upon the balancing required time Tb0 calculated by the balancing control section 28, the charging rate of the storage battery 21 calculated by the charging rate calculating section 30 and the voltage state of the lead battery 31 detected by the lead battery monitoring section 34.

The battery control section 29 causes the balancing control section 28 to execute the balancing control in a time range during which the voltage of the lead battery 31 becomes equal to or more than a predetermined given voltage value V1 and the charging rate of the storage battery 21 becomes equal to or more than a predetermined given charging rate value SOC1 after the key switch 16 is switched from the on state (the drive position) to the off state (the stop position).

The battery control section 29 is provided with a first time calculating section 29A that calculates a first balancing remaining time Tb3 (a first time) as a remaining time required until the balancing control is completed when the key switch 16 is switched from the on state to the off state, a second time calculating section 29B that calculates a first balancing possible time Tb4 (a second time) as a time during which the balancing control is possible based upon the voltage state of the lead battery 31, and a third time calculating section 29C that calculates a second balancing possible time Tb6 (a third time) as a time during which the balancing control is possible based upon the charging rate of the storage battery 21. The battery control section 29 causes the balancing control section 28 to execute the balancing control by a minimum time (a second balancing limit time Tb7) out of the time calculated by the first time calculating section 29A, the time calculated by the second time calculating section 29B, and the time calculated by the third time calculating section 29C.

The battery control section 29 subtracts an elapse time (a continuation time Tb8) after the key switch 16 is switched from the on state to the off state from the minimum time (the second balancing limit time Tb7) to calculate a second balancing remaining time Tb9. The battery control section 29 outputs the second balancing remaining time Tb9 to the vehicle body controller 17. The vehicle body controller 17 outputs the second balancing remaining time Tb9 to the monitor 18. Thereby, the battery control section 29 causes the monitor 18 to display the second balancing remaining time Tb9 as a remaining time of the balancing control.

As shown in FIG. 3, the input side of the charging rate calculating section 30 is connected to the total voltage detector 25 and the current detector 26. The output side of the charging rate calculating section 30 is connected to the battery control section 29. The charging rate calculating section 30 calculates the charging rate of the storage battery 21 based upon a total voltage value Vt detected by the total voltage detector 25 and a current value I detected by the current detector 26. The charging rate calculating section 30 outputs the charging rate of the storage battery 21 to the battery control section 29.

The lead battery 31 configures a second battery that supplies driving power to the battery controller 27. The lead battery 31 supplies the power lower than the storage battery 21. The lead battery 31 is connected via a first relay 32 and the second relay 33 connected in parallel to each other to the battery controller 27.

The first relay 32 is switched between an on state (a connection state) and an off state (a disconnection state) based upon a signal from the key switch 16. The first relay 32 is turned on when the key switch 16 is turned on (is turned to a drive position). The first relay 32 is turned off when the key switch 16 is turned off (is turned to a stop position).

The second relay 33 is switched between an on state (a connection state) and an off state (a disconnection state) in response to a signal (a balancing command) from the battery control section 29. The second relay 33 is turned on when the battery control section 29 outputs the balancing command. The second relay 33 is turned off when the battery control section 29 stops the output of the balancing command. At this time, the second relay 33 is switched from the on state to the off state when the minimum time (the second balancing limit time Tb7) elapses from start of the output of the balancing command.

The input side of the lead battery monitoring section 34 is connected to both ends of the lead battery 31. The output side of the lead battery monitoring section 34 is connected to the battery control section 29. The lead battery monitoring section 34 detects the voltage of the lead battery 31. The lead battery monitoring section 34 outputs the detected voltage value of the lead battery 31 to the battery control section 29.

The input side of the vehicle body controller 17 is connected to the battery control section 29. The output side of the vehicle body controller 17 is connected to the monitor 18. Time information of the balancing control is inputted to the vehicle body controller 17 from the battery control section 29. Specifically, the second balancing remaining time Tb9 is inputted to the vehicle body controller 17 as a remaining time of the balancing control after the key switch 16 is switched to the off state. The vehicle body controller 17 outputs the second balancing remaining time Tb9 to the monitor 18. Thereby, the monitor 18 displays the second balancing remaining time Tb9.

Next, an explanation will be made of the balancing control processing by the battery control section 29 with reference to FIG. 4 and FIG. 5.

When the key switch 16 is turned on, the first relay 32 is turned on to activate the battery controller 27. When the battery controller 27 is activated, the battery control section 29 executes the balancing control processing as shown in FIG. 4 and FIG. 5.

First, in step S1, the second relay 33 is turned on. In subsequent step S2, the balancing command is turned on, which is outputted to the balancing control section 28. Thereby, the balancing control section 28 calculates the balancing required time Tb0 and starts the balancing control. At this time point, the balancing required time Tb0 is the maximum value Tb1 of the time required for the variation in the charging rate of each of the cells 22A to 22N to be reduced to a tolerance range by the balancing control. In subsequent step S3, the battery control section 29 obtains the maximum value Tb1 of the balancing required time Tb0 from the balancing control section 28.

In step S4, the balancing continuation time Tb2 after the key switch 16 is turned on is measured. In subsequent step S5, the signal of the key switch 16 is determined, and the process goes back to step S4 while the key switch 16 is in the on state.

When the key switch 16 is switched from the on state to the off state, the first relay 32 is switched from the on state to the off state. At this time, the process transfers from step S5 to step S6. In step S6, the first balancing remaining time Tb3 is calculated by subtracting the balancing continuation time Tb2 from the maximum value Tb1 of the balancing required time Tb0 (Tb3=Tb1−Tb2). In subsequent step S7, the battery control section 29 determines the first balancing remaining time Tb3. In a case where the first balancing remaining time Tb3 is equal to or less than 0 (Tb3≤0), in step S7 "YES" is determined, and the process goes to step S16.

Meanwhile, in a case where the first balancing remaining time Tb3 is larger than 0 (Tb3>0), in step S7 "NO" is determined, and the process goes to step S8. In step S8, the voltage state of the lead battery 31 is obtained from the lead battery monitoring section 34, and the first balancing possible time Tb4 is calculated based upon the voltage state of the lead battery 31. At this time, the first balancing possible time Tb4 is a time during which it is possible to keep the voltage of the lead battery 31 to be equal to or more than the given voltage value V1 even when the balancing control continues to be executed in a state where the key switch 16 is in the off state. It should be noted that the given voltage value V1 is a voltage in which the engine 7 can be activated using the lead battery 31 when the key switch 16 is switched to the on state next time, for example. That is, the given voltage value V1 is a voltage in which it is possible to drive a starter motor of the engine 7 (not shown) using the lead battery 31, for example.

In subsequent step S9, the first balancing possible time Tb4 is compared with the first balancing remaining time Tb3, and the shorter one is defined as the first balancing limit time Tb5. Therefore, when the first balancing possible time Tb4 is shorter than the first balancing remaining time Tb3 (Tb4<Tb3), the first balancing possible time Tb4 becomes equal to the first balancing limit time Tb5 (Tb5=Tb4). When the first balancing remaining time Tb3 is shorter than the first balancing possible time Tb4 (Tb3<Tb4), the first balancing remaining time Tb3 becomes equal to the first balancing limit time Tb5 (Tb5=Tb3).

In step S10, the charging rate of the storage battery 21 is obtained from the charging rate calculating section 30, and the second balancing possible time Tb6 is calculated based upon the charging rate of the storage battery 21. At this time, the second balancing possible time Tb6 is a time during which it is possible to keep the charging rate of the storage battery 21 to be equal to or more than the given charging rate value SOC1 even when the balancing control continues to be executed in a state where the key switch 16 is in the off state. It should be noted that the given charging rate value SOC1 of the charging rate is, for example, a lower limit value (for example, approximately 30%) in an appropriate use range (for example, 70% to 30%) of the charging rate.

In subsequent step S11, the second balancing possible time Tb6 is compared with the first balancing limit time Tb5, and the shorter one is defined as the second balancing limit time Tb7. Therefore, when the second balancing possible time Tb6 is shorter than the first balancing limit time Tb5 (Tb6<Tb5), the second balancing possible time Tb6 becomes equal to the second balancing limit time Tb7 (Tb7=Tb6). When the first balancing limit time Tb5 is shorter than the second balancing possible time Tb6 (Tb5<Tb6), the first balancing limit time Tb5 becomes equal to the second balancing limit time Tb7 (Tb7=Tb5).

In step S12, the balancing continuation time Tb8 is measured after the key switch 16 is switched from the on state to the off state. At this time, the balancing continuation time Tb8 is a time during which the balancing control continues to be executed after the key switch 16 is switched from the on state to the off state. In subsequent step S13, the second balancing remaining time Tb9 is calculated by subtracting the balancing continuation time Tb8 from the second balancing limit time Tb7 (Tb9=Tb7−Tb8). In step S14, the battery control section 29 outputs the second balancing remaining time Tb9 to the vehicle body controller 17. Thereby, the vehicle body controller 17 causes the monitor 18 to display the second balancing remaining time Tb9.

In step S15, the battery control section 29 determines the second balancing remaining time Tb9. In a case where the second balancing remaining time Tb9 is larger than 0 (Tb9>0), in step S15 "NO" is determined, and the process goes back to step S12. Meanwhile, in a case where the second balancing remaining time Tb9 is equal to or less than 0 (Tb9≤0), in step S15 "YES" is determined, and the process goes to step S16.

In step S16, the balancing command outputted from the step S2 is turned off. In step S17, the second relay 33 is turned off to stop the battery controller 27.

Figure 6:
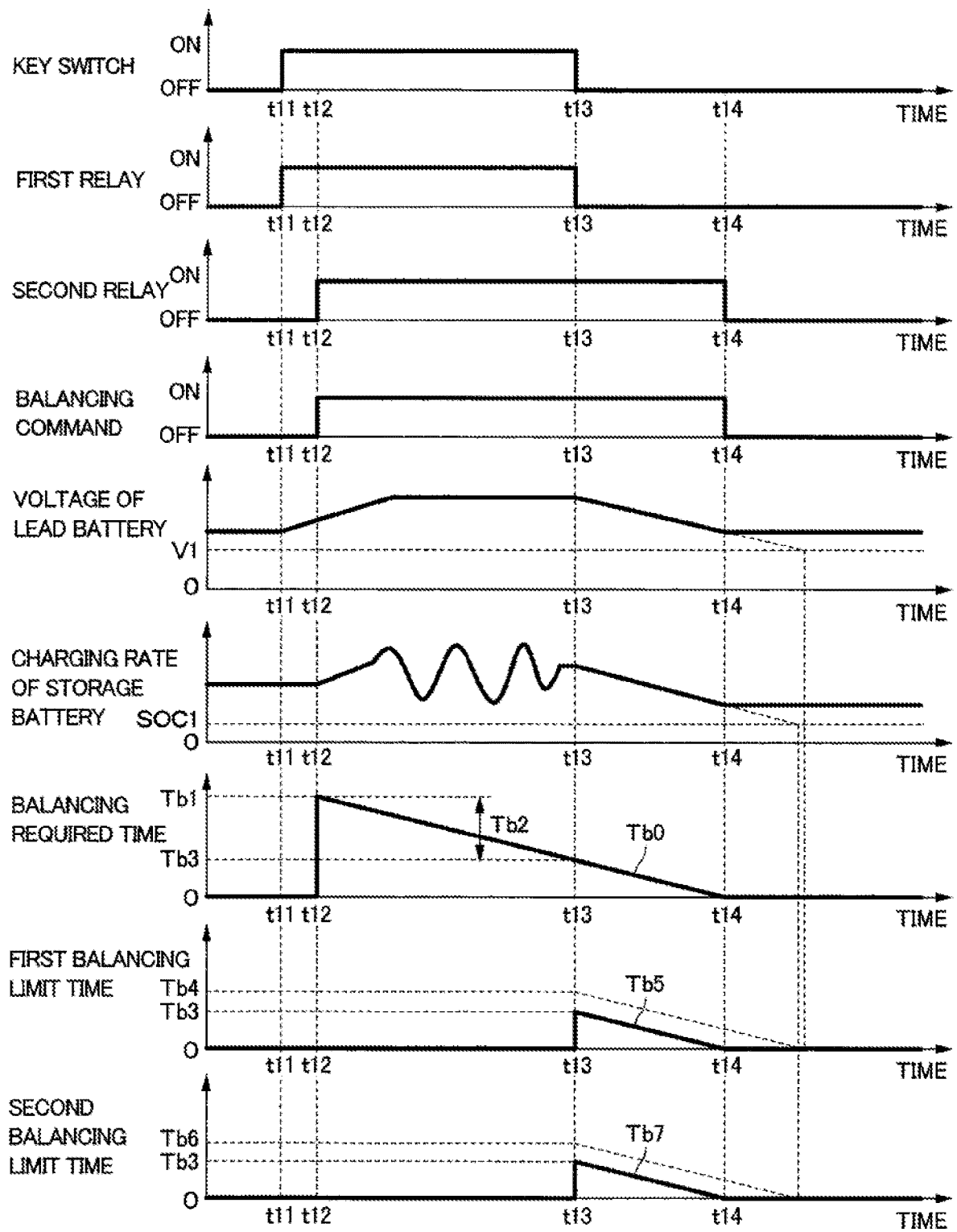
FIG. 6 is a time chart showing a time change in a balancing required time, a first balancing limit time, a second balancing limit time and the like in relation to a case where a voltage of a lead battery and a charging rate of a storage battery are sufficiently high.
Figure 7:
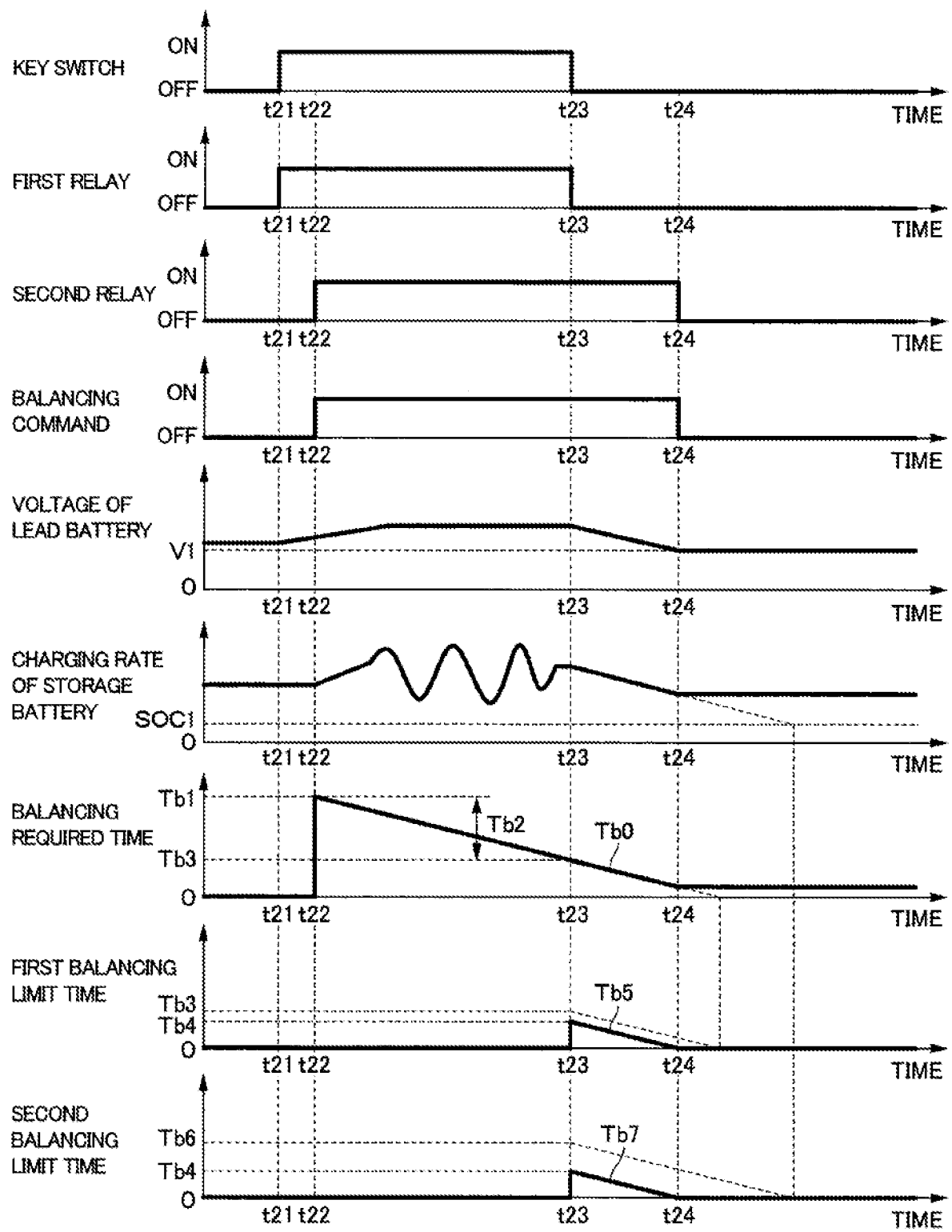
FIG. 7 is a time chart showing a time change in the balancing required time, the first balancing limit time, the second balancing limit time and the like in relation to a case where the voltage of the lead battery is low.
Figure 8:
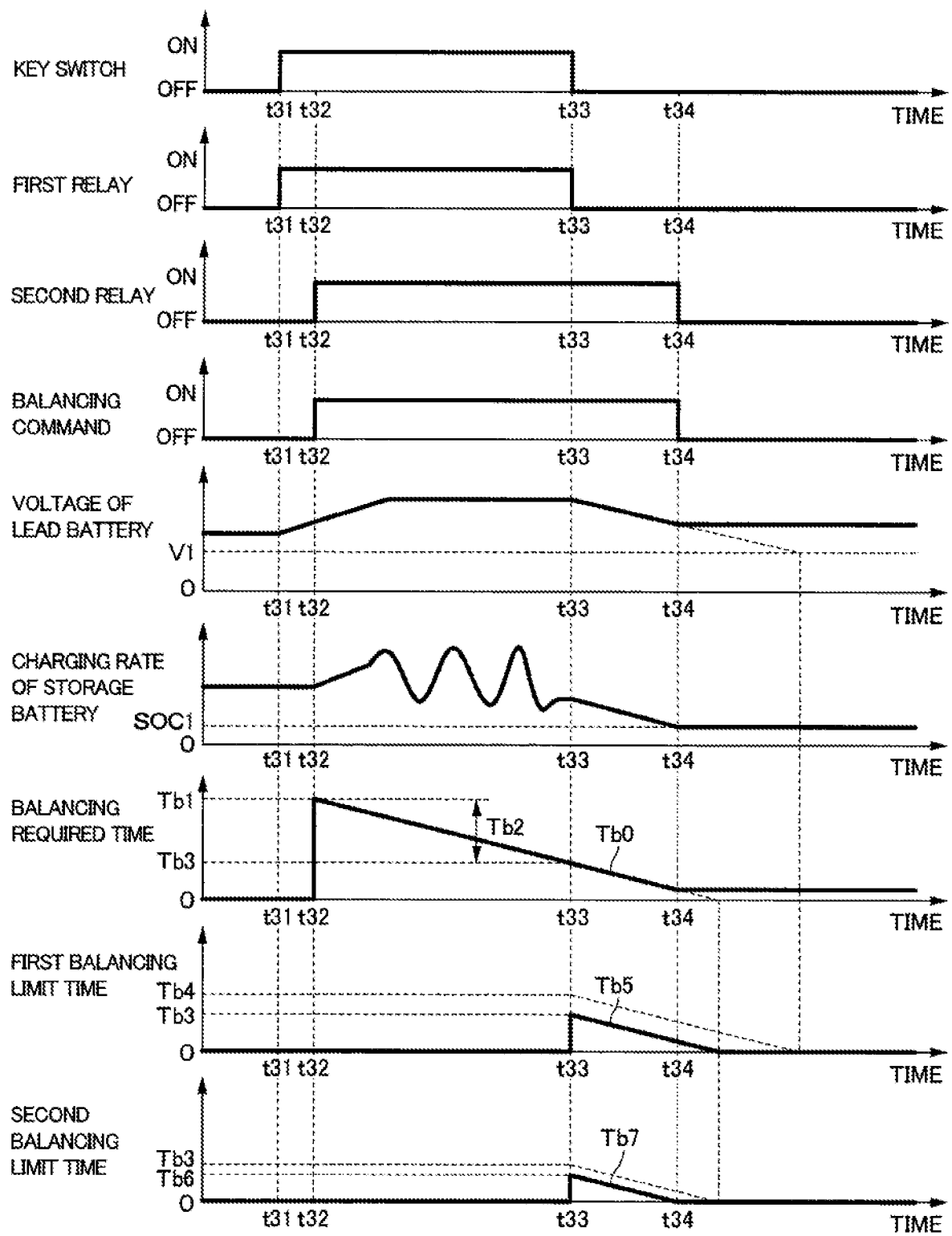
FIG. 8 is a time chart showing a time change in the balancing required time, the first balancing limit time, the second balancing limit time and the like in relation to a case where the charging rate of the storage battery is low.

Next, an explanation will be made of a specific operation of the balancing control according to the present embodiment with reference to FIG. 6 to FIG. 8. FIG. 6 to FIG. 8 show a time change in the key switch 16, the first relay 32, the second relay 33, the balancing command, the voltage of the lead battery 31, the charging rate of the storage battery 21, the balancing required time, the first balancing limit time, and the second balancing limit time.

First, by referring to FIG. 6, an explanation will be made of an example of an operation of the balancing control in a case where a key switch is switched to an off state in a state where the voltage of the lead battery 31 and the charging rate of the storage battery 21 are sufficiently high.

At time t11, the key switch 16 is switched from the off state to the on state, and the first relay 32 is turned on. As a result, the power is supplied to the battery controller 27 from the lead battery 31 to activate the battery controller 27.

At time t12, the battery control section 29 outputs a signal to the second relay 33 to turn on the second relay 33. In addition to it, the battery control section 29 outputs the balancing command in the on state to the balancing control section 28. At this time, the balancing control section 28 calculates the balancing required time Tb0, and transmits the balancing required time Tb0 as the maximum value Tb1 to the battery control section 29. After that, the balancing control of the cells 22A to 22N is executed and the balancing continuation time Tb2 is measured during a period where the key switch 16 is kept in the on state.

At time t13, the key switch 16 is switched from the on state to the off state, and thereby, the first relay 32 is turned off. Meanwhile, since the second relay 33 is in the on state, the battery controller 27 continues to be activated. At this time, the battery control section 29 subtracts the balancing continuation time Tb2 from the maximum value Tb1 of the balancing required time Tb0 to calculate the first balancing remaining time Tb3. The battery control section 29 determines whether or not the first balancing remaining time Tb3 is equal to or less than 0. At time t13, the first balancing remaining time Tb3 is larger than 0.

In addition, the battery control section 29 calculates the first balancing possible time Tb4 from the voltage state of the lead battery 31. At this time, since the voltage of the lead battery 31 is sufficiently higher than the given voltage value V1, the first balancing possible time Tb4 is made long. At time t13, when the first balancing possible time Tb4 and the first balancing remaining time Tb3 are compared, the first balancing remaining time Tb3 is shorter. Therefore, the first balancing limit time Tb5 becomes equal to the first balancing remaining time Tb3.

Likewise, the battery control section 29 calculates the second balancing possible time Tb6 from the charging rate of the storage battery 21. At this time, since the charging rate of the storage battery 21 is sufficiently higher than the given charging rate value SOC1, the second balancing possible time Tb6 is made long. At time t13, when the second balancing possible time Tb6 and the first balancing limit time Tb5 are compared, the first balancing limit time Tb5 is shorter. Therefore, the second balancing limit time Tb7 becomes equal to the first balancing limit time Tb5. Thereby, the second balancing limit time Tb7 becomes the same value as the first balancing remaining time Tb3.

Thereafter, the battery control section 29 subtracts the balancing continuation time Tb8 after the key switch 16 is turned off from the second balancing limit time Tb7 to calculate the second balancing remaining time Tb9. The battery control section 29 executes the balancing control of the cells 22A to 22N during a period until the second balancing remaining time Tb9 becomes equal to 0.

At time t14, the second balancing remaining time Tb9 becomes equal to 0. At this time, the battery control section 29 turns off the balancing command. In addition to it, the battery control section 29 turns off the second relay 33. Thereby, the battery controller 27 is stopped.

As described above, even when the key switch 16 is turned off before the balancing required time Tb0 becomes equal to 0, the balancing control of the cells 22A to 22N is executed until the completion. Thereby, it is possible to equalize the charging rate between the cells 22A to 22N in the storage battery 21.

Next, an explanation will be made of an example of an operation of the balancing control in a case where a key switch is switched to an off state in a state where the voltage of the lead battery 31 is low, with reference to FIG. 7.

Basic operations at time t21 to t23 in FIG. 7 are the same as the operations at time t11 to t13 as shown in FIG. 6. However, since the voltage of the lead battery 31 is in a low state, the first balancing possible time Tb4 based upon the voltage of the lead battery 31 becomes short. Therefore, at time t23, when the first balancing remaining time Tb3 and the first balancing possible time Tb4 are compared, the first balancing possible time Tb4 is shorter. Accordingly, the first balancing limit time Tb5 does not become the first balancing remaining time Tb3, but the first balancing possible time Tb4.

In addition, the battery control section 29 calculates the second balancing possible time Tb6 based upon the charging rate of the storage battery 21. At this time, since the charging rate of the storage battery 21 is in a sufficiently high state, the second balancing possible time Tb6 is longer than the first balancing possible time Tb4. Accordingly, when the second balancing possible time Tb6 and the first balancing limit time Tb5 are compared, the first balancing limit time Tb5 is shorter. Therefore, the second balancing limit time Tb7 becomes equal to the first balancing limit time Tb5. Thereby, the second balancing limit time Tb7 becomes the same value as the first balancing possible time Tb4.

As a result, at time t24, the second balancing remaining time Tb9 becomes equal to 0, and the first balancing possible time Tb4 becomes equal to 0. That is, even when the balancing control continues to be executed in a state where the key switch 16 is in the off state, the balancing control is executed by the upper limit time during which it is possible to keep the voltage of the lead battery 31 to be equal to or more than the given voltage value V1.

As described above, it is made possible to execute the balancing control in a range where the voltage reduction of the lead battery 31 does not affect the next vehicle body activation even after the key switch 16 is turned off.

Next, an explanation will be made of an example of an operation of the balancing control in a case where a key switch is switched to an off state in a state where the charging rate of the storage battery 21 is low, with reference to FIG. 8.

Basic operations at time t31 to t33 in FIG. 8 are the same as the operations at time t11 to t13 as shown in FIG. 6. However, since the charging rare of the storage battery 21 is in a low state, the second balancing possible time Tb6 based upon the charging rate of the storage battery 21 becomes short. Therefore, at time t33, when the first balancing limit time Tb5 and the second balancing possible time Tb6 are compared, the second balancing possible time Tb6 is shorter. Accordingly, the second balancing limit time Tb7 becomes equal to the second balancing possible time Tb6.

As a result, at time t34, the second balancing remaining time Tb9 becomes equal to 0, and the second balancing possible time Tb6 becomes equal to 0. That is, even when the balancing control continues to be executed in a state where the key switch 16 is in the off state, the balancing control is executed by the upper limit time during which it is possible to keep the charging rate of the storage battery 21 to be equal to or more than the given charging rate value SOC1.

As described above, it is made possible to execute the balancing control in a range where a reduction in the charging rate of the storage battery 21 does not affect the next vehicle body activation even after the key switch 16 is turned off.

Thus, according to the embodiment, the battery controller 27 executes the balancing control in a time range during which the voltage of the lead battery 31 becomes equal to or more than the predetermined given voltage value V1 and the charging rate of the storage battery 21 becomes equal to or more than the predetermined given charging rate value SOC1 after the key switch 16 is switched from the on state (the drive position) to the off state (the stop position).

At this time, the battery controller 27 calculates the first balancing remaining time Tb3 (the first time) as a remaining time required until the balancing control is completed when the key switch 16 is switched from the on state to the off state, calculates the first balancing possible time Tb4 (the second time) as a time during which the balancing control is possible based upon the voltage state of the lead battery 31, and calculates the second balancing possible time Tb6 (the third time) as a time during which the balancing control is possible based upon the charging rate of the storage battery 21. In addition, the battery controller 27 executes the balancing control by the minimum time (the second balancing limit time Tb7) out of the first balancing remaining time Tb3 (the first time), the first balancing possible time Tb4 (the second time) and the second balancing possible time Tb6 (the third time).

Therefore, even when the key switch 16 is switched to the off state in a state where the variation in the voltage of the cells 22A to 22N in the storage battery 21 remains, it is possible to continue to execute the balancing control. At this time, even when the balancing control is executed in a state where the key switch 16 is in the off state, the voltage of the lead battery 31 is kept to be equal to or more than the given voltage value V1 required for the next activation of the vehicle body. In addition to it, even when the balancing control is executed in a state where the key switch 16 is in the off state, the charging rate of the storage battery 21 is kept to be equal to or more than the given charging rate value SOC1 required for the next activation of the vehicle body. As a result, it is possible to equalize the charging rate between the cells 22A to 22N in consideration of a state of the storage battery 21 and the lead battery 31 preventing the activation of the vehicle body from being affected.

In addition, the battery controller 27 subtracts the elapse time (the balancing continuation time Tb8) after the key switch 16 is switched from the on state (the drive position) to the off state (the stop position) from the minimum time (the second balancing limit time Tb7) during which the balancing control is executed, and causes the monitor 18 to display the remaining time (the second balancing remaining time Tb9) of the balancing control. Therefore, an operator can recognize the remaining time when the balancing control is executed after the key switch 16 is turned to the off state, by looking at the monitor 18 visually.

In addition, the lead battery 31 is connected via the first relay 32 and the second relay 33 parallelly connected to each other to the battery controller 27. At this time, the first relay 32 is turned to the on state (the connection state) when the key switch 16 is switched to the on state (the drive position), and is turned to the off state (the disconnection state) when the key switch 16 is switched to the off state (the stop position). In addition, the second relay 33 is turned to the on state (the connection state) when the battery controller 27 executes the balancing control, and is turned to the off state (the disconnection) when the second balancing limit time Tb7 (the minimum time) elapses from a point where the balancing control starts. Therefore, even after the key switch 16 is switched to the off state, the power from the lead battery 31 is supplied via the second relay 33 to the battery controller 27 while the battery control section 29 is outputting the balancing command. Thereby, the battery control section 29 can cause the balancing control section 28 to continue to execute the balancing control even after the key switch 16 is switched to the off state.

It should be noted that in the embodiment, a case where the battery unit 20 is provided with the single series circuit in which the cells 22A to 22N are series-connected is explained as an example. The present invention is not limited thereto, but, for example, an electricity storage device may be configured such that there are provided a plurality of series circuits in which a plurality of cells are series-connected and these series circuits are parallelly connected.

Figure 9:
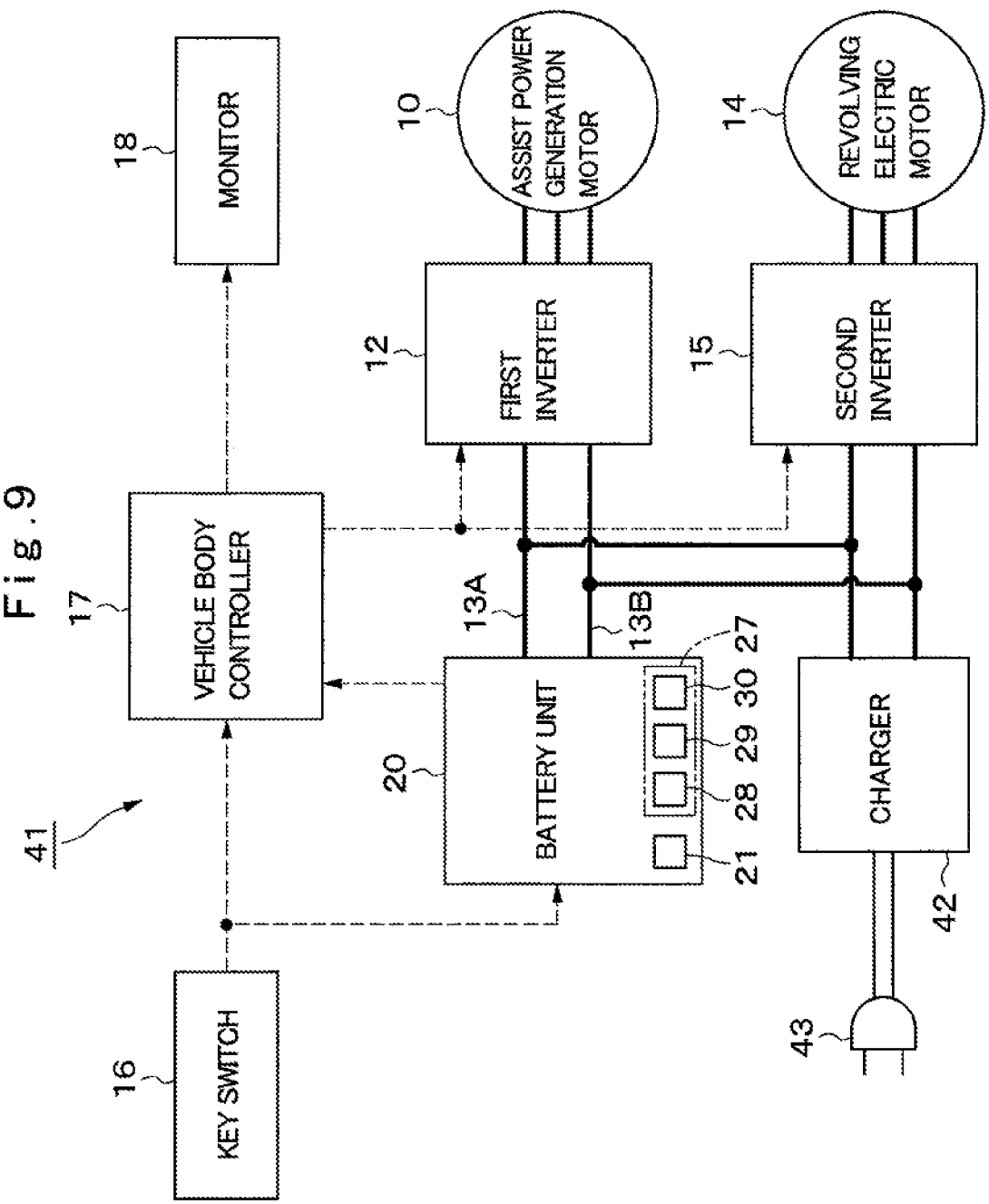
FIG. 9 is a block diagram showing a drive system of an electric hydraulic excavator according to a modification example.

In the embodiment, the hybrid hydraulic excavator 1 provided with the engine 7, the assist power generation motor 10 and the battery unit 20 is explained as an example. The present invention is not limited thereto, but may be, as a modification example in FIG. 9, applied to an electric hydraulic excavator 41. In this case, the hydraulic excavator 41 is provided with a charger 42 for charging the battery unit 20 from an exterior with an engine removed. The charger 42 is connected to the DC buses 13A, 13B. The charger 42 has an external power source connecting terminal 43 for connection to an external power source such as a commercial power source. The charger 42 supplies power supplied from the external power source connecting terminal 43 to the battery unit 20 to charge the storage battery 21 in the battery unit 20.

At this time, the battery control section 29 in the battery controller 27 calculates the first balancing possible time Tb4 based upon the voltage of the lead battery 31. The first balancing possible time Tb4 is a time during which the voltage of the lead battery 31 can be kept to be equal to or more than the given voltage value V1 even when the balancing control continues to be executed in a case where the key switch 16 is in the off state. In this case, the given voltage value V1 is a voltage with which the activation of the battery controller 27 is made possible using the lead battery 31 when the key switch 16 is turned to the on state the next time, for example.

In the embodiment, the storage battery 21 composed of the lithium-ion secondary battery is explained as an example of the first battery. The present invention is not limited thereto, but the first battery may be a secondary battery composed of another material or may be a capacitor. In addition, in the embodiment, the lead battery is explained as an example of the second battery. The present invention is not limited thereto, but the second battery may be a lithium-ion secondary battery or a secondary battery composed of another material.

In the embodiment, the assist power generation motor 10 and the revolving electric motor 14 are connected to the battery unit 20. The present invention is not limited thereto, but only the assist power generation motor 10 may be connected to the battery unit 20 with the revolving electric motor 14 removed.

In the embodiment, the hydraulic excavator 1 is explained as an example of the construction machine. The present invention is not limited thereto, but may be applied to various construction machines such as a wheel loader.

DESCRIPTION OF REFERENCE NUMERALS 1, 41: Hydraulic excavator (Construction machine)
5: Working mechanism
8: Hydraulic pump
10: Assist power generation motor
14: Revolving electric motor
16: Key switch
17: Vehicle body controller
18: Monitor
20: Battery unit
21: Storage battery (First battery)
22A to 22N: Cell
24A to 24N: Cell voltage detector
25: Total voltage detector
26: Current detector
27: Battery controller
28: Balancing control section
29: Battery control section
30: Charging rate calculating section
31: Lead battery (Second battery)
32: First relay
33: Second relay
34: Lead battery monitoring section

The invention claimed is:

1. A construction machine comprising:
a hydraulic pump driven by an electric motor;
a working mechanism driven by hydraulic oil delivered from
the hydraulic pump;
a first battery that is configured of a plurality of cells series-connected to each other and supplies power to the electric motor;
a cell voltage detector that detects a cell voltage of each of the plurality of cells;
a battery controller to which power is supplied from a second battery and that executes balancing control for reducing variation in the cell voltage of the plurality of cells; and
a key switch having a drive position for driving the electric motor and a stop position for stopping the electric motor, wherein the battery controller:
calculates a first time as a remaining time required until the balancing control is completed when the key switch is switched from the drive position to the stop position,
calculates a second time as a time during which the balancing control is possible based upon the voltage state of the second battery,
calculates a third time as a time during which the balancing control is possible based upon the charging rate of the first battery, executes the balancing control by a minimum time out of the first time, the second time, and the third time, and executes the balancing control in a time range during which a voltage of the second battery becomes equal to or more than a predetermined given voltage value and a charging rate of the first battery becomes equal to or more than a predetermined given charging rate value after the key switch is switched from the drive position to the stop position.

2. The construction machine according to claim 1, wherein the battery controller:

subtracts an elapse time after the key switch is switched from the drive position to the stop position from the minimum time, and causes a monitor to display a remaining time of the balancing control.

3. The construction machine according to claim 1, wherein:

the second battery is connected via a first relay and a second relay parallelly connected to each other to the battery controller, the first relay is turned to a connection state when the key switch is switched to the drive position, and is turned to a disconnection state when the key switch is switched to the stop position, and the second relay is turned to a connection state when the battery controller executes the balancing control, and is turned to a disconnection state when the minimum time elapses from a point where the balancing control starts.

* * * * *